United States Patent
Grossardt et al.

[11] Patent Number: 5,527,102
[45] Date of Patent: Jun. 18, 1996

[54] METHOD FOR MINIMIZING THE AMPLITUDE OF PRESSURE MODULATION IN AN ABS CONTROL CYCLE

[75] Inventors: Bernd Grossardt, Bönnigheim; Eberhard Sonntag, Gerlingen, both of Germany

[73] Assignee: Robert Bosch GmbH, Stuttgart, Germany

[21] Appl. No.: 325,307

[22] PCT Filed: Mar. 30, 1994

[86] PCT No.: PCT/DE94/00357

§ 371 Date: Nov. 8, 1994

§ 102(e) Date: Nov. 8, 1994

[87] PCT Pub. No.: WO94/22697

PCT Pub. Date: Oct. 13, 1994

[30] Foreign Application Priority Data

Apr. 3, 1993 [DE] Germany ............... 43 11 077.0

[51] Int. Cl.⁶ ............... F02F 3/10; B22D 19/08; B05D 7/14
[52] U.S. Cl. ............... 303/165; 303/158

[58] Field of Search ............... 303/156, 157, 303/158, 185, 165; 364/426.02

[56] References Cited

U.S. PATENT DOCUMENTS

| | | | |
|---|---|---|---|
| 4,923,255 | 5/1990 | Braschel et al. | 303/158 |
| 4,985,839 | 1/1991 | Dominke | 303/158 X |
| 5,080,448 | 1/1992 | Mori et al. | 303/163 |
| 5,249,852 | 10/1993 | Beyer et al. | 303/156 |
| 5,251,970 | 10/1993 | Braschel et al. | 303/185 |

*Primary Examiner*—Josie Ballato
*Attorney, Agent, or Firm*—Felfe & Lynch

[57] ABSTRACT

A brake system is described which calculates the duration of the pressure reduction signal. In this case, the wheel acceleration (or the wheel reacceleration) and the slip are determined in the unstable region of the wheel and related to prescribed magnitudes, from which the calculation of the reduction time of the new control cycle is performed in such a way that the wheel reacceleration following the pressure reduction corresponds to a precalculated magnitude. This signal duration is corrected in order to keep the amplitude of the pressure modulation small.

5 Claims, 1 Drawing Sheet

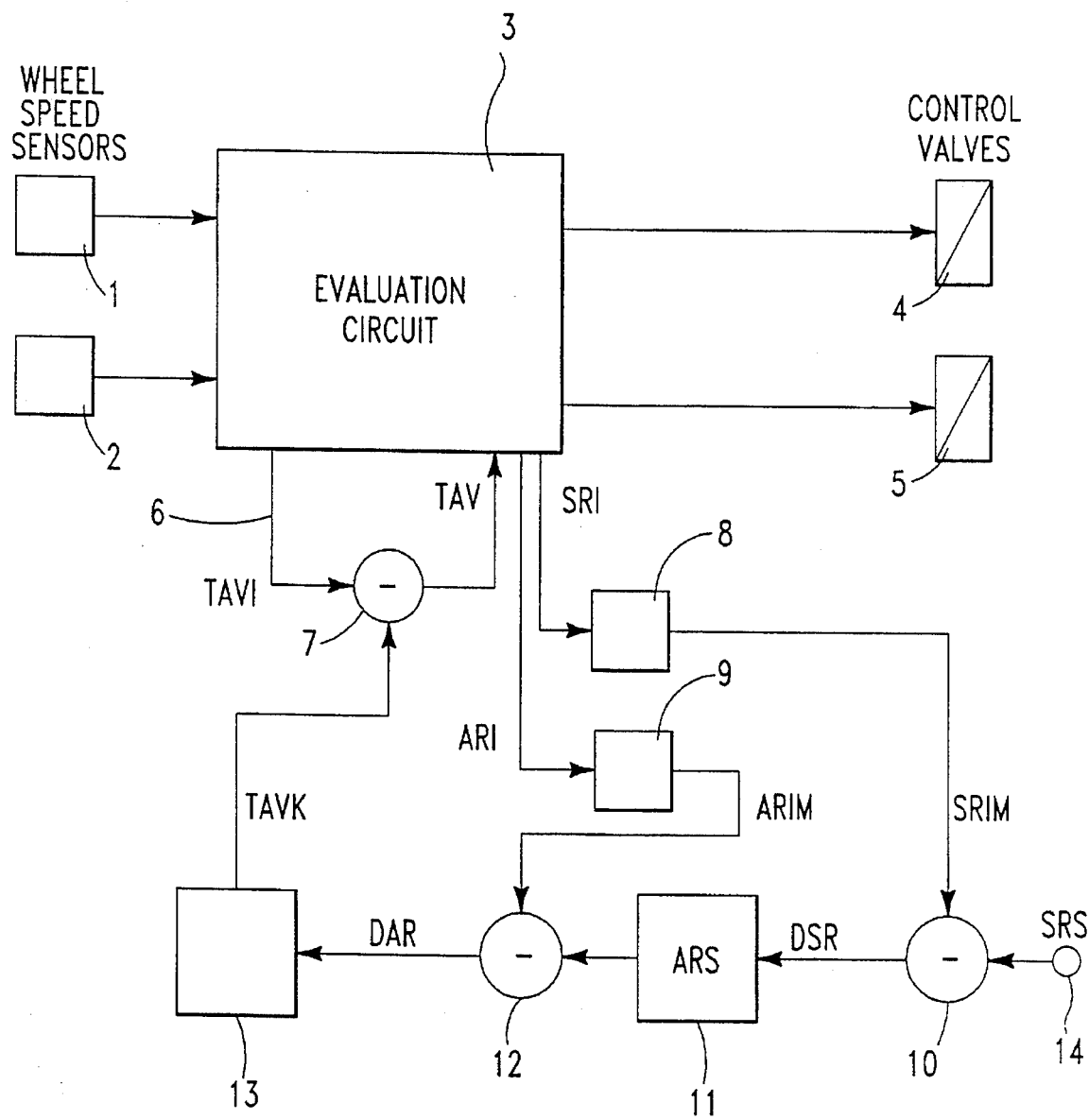

METHOD FOR MINIMIZING THE AMPLITUDE OF PRESSURE MODULATION IN AN ABS CONTROL CYCLE

BACKGROUND OF THE INVENTION

The invention relates to a method for controlling brake pressure in a motor vehicle wherein wheel speed signals are used to generate slip signals and wheel acceleration signals, which in turn are used to generate brake pressure control signals.

The quality of the braking retardation of an ABS-controlled vehicle and the pedal reactions depend on the rapidity with which the required optimum pressure level is reached, the amplitude of the pressure modulation having to be very small. The amplitude of the pressure modulation is substantially dependent in this case on the magnitude of the preceding pressure reduction or on how long the period of activation of the discharge valve is.

As an example, a method is known for dimensioning the discharge valve activation time which uses a constant magnitude to correct a value determined from the "prehistory" of the control, and can vary this time as a function of the current wheel behavior.

Also known is a method which uses just such a time value from the prehistory, but calculates it with the aid of a correction value dependent on the wheel acceleration of the previous control cycle, the correction value being inversely proportional to the wheel acceleration.

The disadvantage of these known solutions is that owing to the ever present system delay times the pressure reduction does not match the physical wheel behavior, or that because of roadway defects which are present the ABS control reacts with control fluctuations, for example in the case of small wheel reaccelerations, so that overall the aim of a small pressure modulation is not achieved.

SUMMARY OF THE INVENTION

These disadvantages are removed by the proposed brake system by determining the wheel acceleration (or the wheel reacceleration) and the slip in the unstable region of the wheel and relating them to prescribed magnitudes, from which the calculation of the reduction time of the new control cycle is performed in such a way that the wheel reacceleration following the pressure reduction corresponds to a precalculated magnitude.

In this case, the invention proceeds from a brake system, in general an antilock system, for the wheels of a vehicle, consisting of sensors for determining the behavior of the wheel motion, an evaluation circuit for processing the sensor signals and for generating brake pressure control signals, and a brake pressure control unit which is fed the brake pressure control signals for the purpose of pressure variation. It is possible in this way to form slip signals and acceleration signals of at least one wheel or a wheel group. The invention is distinguished in that the brake pressure control signals are determined in such a way that the acceleration of at least one wheel is limited to values which depend on the maximum slip value within a prescribable time interval. The maximum slip value can be determined for this purpose within the prescribable time interval from the slip signals. The brake pressure control signals are then determined in such a way that the acceleration of at least one wheel is limited to values which depend on the maximum slip value.

It is particularly advantageous that brake pressure control signals whose duration is determined as a function of the maximum slip value determined are generated for the purpose of pressure variation.

Furthermore, it can be provided in an advantageous embodiment of the invention that a basic duration and a correcting quantity for correcting the basic duration are determined in order to determine the duration of the brake pressure control signals, the correcting quantity being determined as a function of the maximum slip value determined.

The prescribed time interval can correspond to a control cycle. The abovementioned correcting quantity is then used to correct the basic duration of the pressure variation in the following control cycle.

Furthermore, it is advantageous that the maximum acceleration value is determined within the prescribable time interval from the acceleration signals of at least one wheel or a wheel group. A corrected desired value for the acceleration of the wheel or the wheels is then determined from the maximum slip value determined, whereupon this desired value is compared with the maximum acceleration value determined. The correcting quantity can then be determined as a function of the difference between the maximum acceleration value determined and the corrected desired value.

Further advantageous embodiments of the invention are to be gathered from the exemplary embodiments described below.

BRIEF DESCRIPTION OF THE DRAWINGS

The sole FIGURE is a diagram of an embodiment of the brake system used to practice the invention.

DETAILED DESCRIPTION OF THE PREFERRED EMBODIMENT

Wheel speed sensors 1 and 2 at the wheels of an axle generate signals which are evaluated in an evaluation circuit 3. Brake pressure control signals for 3/3 brake pressure control valves 4 and 5 assigned to the wheels are generated in the evaluation circuit 3 as a function of the behavior determined of the wheel motion. The evaluation circuit calculates inter alia the activation period TAVI for the individual valves 4 and 5.

The following description applies to one of the wheels. Precisely the same device is also provided for the other wheel. The correction circuit described in the following paragraphs is actually part of the evaluation circuit 3.

Via a line 6, the evaluation circuit transmits the period TAVI of the pressure reduction signal to a subtractor 7 which corrects this period and feeds the corrected signal back to the evaluation circuit for processing.

The evaluation circuit 3 supplies the wheel slip SRI determined there and the wheel reacceleration ARI for the purpose of determining the correction. The wheel slip SRI can, for example, be determined in a known way in accordance with $SRI=(Vf-Vr)/Vf$ from the measured wheel speed Vr and the vehicle longitudinal speed Vf. The wheel reacceleration or the wheel acceleration ARI can be obtained by differentiating the rotational wheel speed or the wheel speed Vr with respect to time.

The maximum value SRIM and ARIM of these variables is determined and stored in a control cycle in blocks 8 and 9, respectively. A desired slip value SRS of, for example, 7% is prescribed at a terminal 14. A subtractor 10 forms the difference $DSR=(SRIM-SRS)*C_1 +C_2$. $C_1$ and $C_2$ are system constants which can be, for example, 0.7 and 0, respectively. A desired value ARS of the wheel acceleration is determined from the difference DSR in a transfer element 11 by means of a linear function ARS= f(DSR); this desired value is compared in a subtractor 12 with the maximum value ARIM determined. The difference $DAR=(ARIM-ARS)*C_3$ is fed to a transfer element 13 which forms therefrom via a linear function TAVK=f(DAR) the correction value TAVK for the duration of the pressure reduction signal, which is fed to the subtractor 7. DAR can be, for example, 1 g, from which it follows that TAVK= 3 ms; $C_3$ can be, for example, 3 ms/g.

A correction of somewhat different type is described in the following lines. A correction ARK for the desired value of the wheel reacceleration is calculated from the slip deviation DSR= SRIM–SRS, SRS being prescribed as, for example, 5% in relation to the reference speed ARK=DSR* $C_1'$. The desired value of the acceleration is corrected using the correction value of the wheel acceleration. The constant has a magnitude of, for example, C1'=0.7%/g.
ARS=ARK+C2'

Consequently, the desired value ARS of the wheel acceleration is available; the constant can then be, for example, C2'=3.5 g.
DAR=ARIM-ARS DAR as a result of the actual/desired comparison is converted by means of the constant C3 into a correction time for the following reduction.
TAVK= DAR * C3

A suitable magnitude is, for example, C3=4 ms/g.

If, for example, the extreme values of a wheel deflection are
SRIM= 9% and
ARIM= 8 g,
the reduction time correction by which the following reduction is computed from the old value is calculated as follows:

|  |  |  |
|---|---|---|
| DRS | = 9% – 5% | = 4%, |
| ARK | = 4% · 0.7 g/% | = 2.8 g, |
| ARS | = 3.5 g + 2.8 g | = 6.3 g, |
| DAR | = 8 g – 6.3 g | = 1.7 g |
| TAVK | = 1.7 g · 4 ms/g | = 6.8 ms |

Since the preceding reduction was too large, the wheel had, at 8 g, too large a reacceleration; consequently, the new reduction is initialized predictively smaller by approximately 7 ms than the old value.

*TAV=TAVI–7 ms*

It may be said in summary that the antilock control system according to the invention consists of sensors for determining the behavior of the wheel motion, an evaluation circuit for processing the sensor signals and for generating brake pressure control signals, and a brake pressure control unit which is fed the brake pressure control signals for the purpose of pressure variation. In this case, slip signals and acceleration and deceleration signals of the wheels or wheel groups are formed and pressure reduction signals which have been determined and whose duration TAVI is determined in the evaluation circuit are gene-rated. The core of the invention is that the maximum slip value SRIM and the maximum wheel reacceleration value ARIM are respectively determined within a control cycle, and that a corrected desired value ARS of the wheel acceleration is obtained from the maximum slip value SRIM, and that this desired value ARS of the wheel acceleration is compared with the maximum wheel reacceleration value ARIM and the difference DAR is used to form a correcting quantity TAVK =f (DAR) for the duration TAVI of the pressure reduction pulse in the following control cycle, by means of which the duration TAVI of the pressure reduction is corrected (TAV= (TAVI–TAVK)).

A brake system is described which calculates the duration of the pressure reduction signal. In this case, the wheel acceleration (or the wheel reacceleration) and the slip are determined in the unstable region of the wheel and related to prescribed magnitudes, from which the calculation of the reduction time of the new control cycle is performed in such a way that the wheel reacceleration following the pressure reduction corresponds to a precalculated magnitude. This signal duration is corrected in order to keep the amplitude of the pressure modulation small.

We claim:

1. Apparatus for controlling brake pressure in a motor vehicle having wheels, said apparatus comprising means for determining speeds of the wheels, means for generating slip signals SRI for at least one wheel based on said wheel speeds, means for generating acceleration signals ARI for said at least one wheel based on the respective wheel speed, means for determining a maximum slip value SRIM within a prescribed time interval based on said slip signals SRI, means for determining a desired wheel acceleration value ARS which is a function of SRIM, means for generating a brake pressure reduction signal having a duration TAV from said value ARS in order to vary brake pressure in such a way that ARI for said at least one wheel is limited to ARS, and means for reducing brake pressure at said at least one wheel for said duration TAV in response to said brake pressure reduction signal.

2. Method for controlling brake pressure in a motor vehicle having wheels and brake pressure control devices at said wheels, said method comprising determining speeds of the wheels, generating slip signals SRI for at least one wheel from said wheel speeds, generating acceleration signals ARI for said at least one wheel based on the respective wheel speed, determining a maximum slip value SRIM within a prescribed time interval from said slip signals SRI, determining a desired wheel acceleration value ARS which is a function of SRIM, generating a brake pressure reduction signal having a duration TAV from said value ARS in order to vary brake pressure in such a way that ARI for said at least one wheel is limited to ARS, and reducing brake pressure for said duration TAV in response to said brake pressure reduction signal.

3. Method as in claim 2, wherein said brake pressure reduction signal is generated by generating a basic duration TAVI from said wheel speeds, generating a correcting quantity TAVK as a function of ARS, and determining said duration TAV according to TAV= TAVI–TAVK.

4. Method as in claim 3 wherein said prescribed time interval corresponds to a control cycle in which brake pressure is reduced and subsequently increased until the wheel slip is within prescribed limits, said correcting quantity TAVK being used to correct said duration TAVI in the following control cycle.

5. Method as in claim 3 wherein said correcting quantity TAVK is generated by determining a maximum acceleration value ARIM during said prescribed time interval from said signals ARI, determining a difference DAR according to DAR= ARIM−ARS, and determining said correcting quantity TAVK as a function of said difference DAR.

* * * * *